(12) United States Patent
Mangharam et al.

(10) Patent No.: US 11,213,747 B2
(45) Date of Patent: Jan. 4, 2022

(54) SYSTEMS OF STACKING INTERLOCKING BLOCKS

(71) Applicant: The Trustees of the University of Pennsylvania, Philadelphia, PA (US)

(72) Inventors: Rahul Mangharam, Philadelphia, PA (US); Matthew Edward O'Kelly, Philadelphia, PA (US); Vincent Scott Pacelli, Philadelphia, PA (US); Matthew Anthony Brady, Coatesville, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 138 days.

(21) Appl. No.: 16/084,816

(22) PCT Filed: Mar. 16, 2017

(86) PCT No.: PCT/US2017/022722
§ 371 (c)(1),
(2) Date: Sep. 13, 2018

(87) PCT Pub. No.: WO2017/161127
PCT Pub. Date: Sep. 21, 2017

(65) Prior Publication Data
US 2019/0076735 A1 Mar. 14, 2019

Related U.S. Application Data

(60) Provisional application No. 62/309,087, filed on Mar. 16, 2016.

(51) Int. Cl.
*A63F 13/426* (2014.01)
*A63H 33/04* (2006.01)
(Continued)

(52) U.S. Cl.
CPC ......... *A63F 13/426* (2014.09); *A63H 33/042* (2013.01); *A63H 33/046* (2013.01);
(Continued)

(58) Field of Classification Search
CPC ... A63F 13/426; A63H 33/042; A63H 33/046; A63H 33/086; A63H 33/26; G06T 19/20
See application file for complete search history.

(56) References Cited

U.S. PATENT DOCUMENTS

| 6,547,624 B1 | 4/2003 | Bojesen et al. |
| 6,741,245 B1 | 5/2004 | Marks et al. |

(Continued)

FOREIGN PATENT DOCUMENTS

| GB | 2499584 A | 2/2012 | |
| GB | 2499584 A * | 8/2013 | ............... G04F 3/08 |

(Continued)

OTHER PUBLICATIONS

Notification of Transmittal of the International Search Report and the Written Opinion of the International Searching Authority, or the Declaration for International Patent Application Serial No. PCT/US17/22722 (dated Jun. 9, 2017).
(Continued)

*Primary Examiner* — Robert T Clarke, Jr.
(74) *Attorney, Agent, or Firm* — Jenkins, Wilson, Taylor & Hunt, P.A.

(57) ABSTRACT

A system of stacking interlocking blocks can be configured into a series of states in order to capture and display both physical and virtual events or content. In some examples, the system includes the stacking interlocking blocks, a grid base having the stacking interlocking blocks stacked on top of the grid base in a physical configuration, and a user system. Each stacking interlocking block includes a block circuit. The grid base includes an embedded computing system
(Continued)

configured, by virtue of communicating with each of the block circuits, to determine a position of each stacking interlocking block with respect to the grid base and in some cases both the grid base and the other blocks which have been detected by the grid base.

20 Claims, 9 Drawing Sheets

(51) Int. Cl.
  *A63H 33/08* (2006.01)
  *A63H 33/26* (2006.01)
  *G06T 19/20* (2011.01)

(52) U.S. Cl.
  CPC ........... *A63H 33/086* (2013.01); *A63H 33/26* (2013.01); *G06T 19/20* (2013.01)

(56) References Cited

U.S. PATENT DOCUMENTS

| | | | |
|---|---|---|---|
| 6,977,540 B2* | 12/2005 | Vandenberg | H03K 17/7955 327/333 |
| 7,316,567 B2 | 1/2008 | Hsieh et al. | |
| 9,320,980 B2 | 4/2016 | Schweikardt et al. | |
| 9,419,378 B2 | 8/2016 | Bdeir | |
| 9,555,338 B2 | 1/2017 | Karunaratne | |
| 2002/0196250 A1* | 12/2002 | Anderson | A63H 33/042 345/420 |
| 2007/0184722 A1* | 8/2007 | Doherty | A63H 33/086 439/638 |
| 2008/0166926 A1 | 7/2008 | Seymour et al. | |
| 2014/0302740 A1 | 10/2014 | Nag | |
| 2014/0378023 A1 | 12/2014 | Muthyala et al. | |

FOREIGN PATENT DOCUMENTS

| | | |
|---|---|---|
| WO | WO 2010/150232 A1 | 12/2010 |
| WO | WO 2014/167565 A1 | 10/2014 |
| WO | WO 2016/036101 A1 | 3/2016 |

OTHER PUBLICATIONS

"Amiibo," Wikipedia, https://en.wikipedia.org/wiki/Amiibo, pp. 1-19 (Accessed Mar. 27, 2019).

"Lego Dimensions," Wikipedia, https://en.wikipedia.org/wiki/Lego_Dimensions, pp. 1-20 (Accessed Mar. 27, 2019).

"Skylanders," Wikipedia, https://en.wikipedia.org/wiki/Skylanders, pp. 1-11 (Accessed Mar. 27, 2019).

"Disney Infinity (video game)," Wikipedia, https://en.Wikipedia.org/wiki/Disney_Infinity_(video_game), pp. 1-10 (Accessed Mar. 27, 2019).

Notification Concerning Transmittal of International Preliminary Report on Patentability for International Patent Application Serial No. PCT/US2017/022722 (dated Sep. 27, 2018).

"'Smart' Blocks Turn Lego Creations into Web-Connected Toys," LiveScience, https://web.archive.org/web/20160608072910/https://www.livescience.com/54997-brixo-electric-blocks-for-lego.html, pp. 1-4 (Jun. 7, 2016).

* cited by examiner

SYSTEMS OF STACKING INTERLOCKING BLOCKS

PRIORITY CLAIM

The present application claims the benefit of U.S. Patent Application Ser. No. 62/309,087, filed Mar. 16, 2016, the disclosure of which is incorporated herein by reference in its entirety.

TECHNICAL FIELD

This specification relates generally to systems of stacking interlocking blocks, e.g., a system that can detect positions of stacking interlocking blocks and shadow the physical configuration of the stacking interlocking blocks in a virtual environment.

BACKGROUND

Conventional toy building block sets are well known and are generally considered to be an important part of a child's learning and development process. In addition to providing important cognitive development through the act of manipulation, they allow children to use imagination and/or creativity to build and/or create a large number of configurations and/or structures. Since each built structure exists only as a physical entity, these constructions must be dismantled when the blocks are needed for building new structures, that is, they do not interact with the growing variety of virtual platforms with which children engage during play.

Virtual platforms afford children a constantly evolving variety of content-based play experiences that can engage imaginations with stories and character development, puzzles and challenges, and synchronous and asynchronous social play with children in the same or in remote locations. Furthermore, creations can exist in the virtual world long after the physical manifestation has been disassembled, allowing for a persistence of creations that is not possible with conventional blocks.

Therefore, it would be desirable to create a set of blocks that can be used for construction in a conventional, physical way but can also directly interact with virtual platforms in real time by displaying a mirrored digital shadow of the block configuration.

SUMMARY

A system of stacking interlocking blocks can be configured into a series of states in order to capture and display both physical and virtual events or content. In some examples, the system includes the stacking interlocking blocks, a grid base having the stacking interlocking blocks stacked on top of the grid base in a physical configuration, and a user system. Each stacking interlocking block includes a block circuit. The grid base includes an embedded computing system configured, by virtue of communicating with each of the block circuits, to determine a position of each stacking interlocking block with respect to the grid base and in some cases both the grid base and the other blocks which have been detected by the grid base. The user system is in communication with the embedded computing system. The user system can include a display device and one or more processors configured to shadow the physical configuration of the stacking interlocking blocks in a virtual environment using the positions of the stacking interlocking blocks and display a view of the virtual environment on the display device. The processors associated with the user system may be local or remote, for example events from the grid base may be transmitted to servers which process the events and render content for local and/or remote display(s).

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1A:
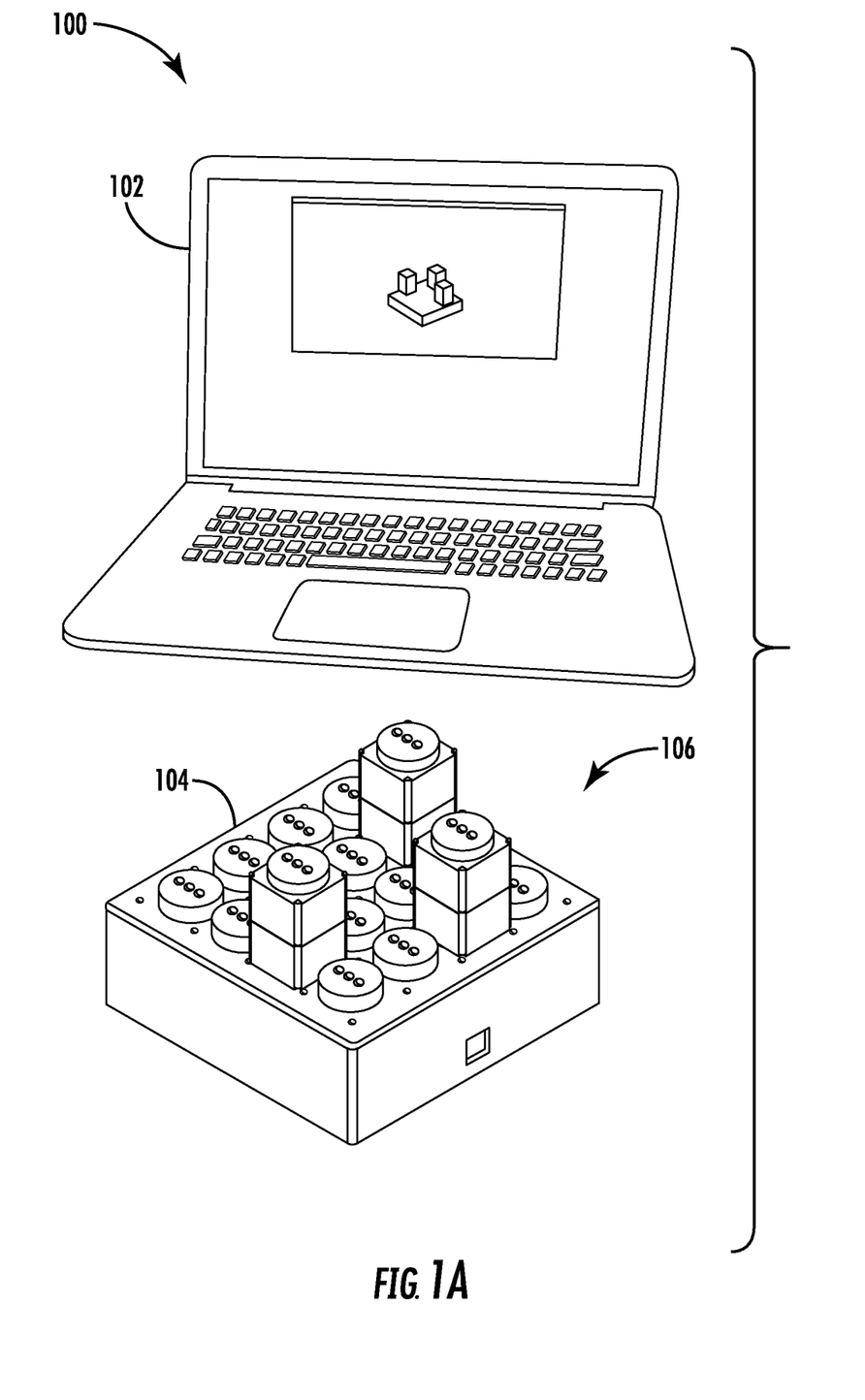
FIGS. 1A-G illustrate an example system for shadowing a physical configuration of stacking interlocking blocks in a virtual representation.
Figure 1B:
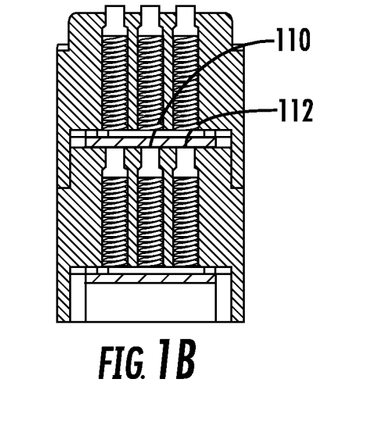
Figure 1C:
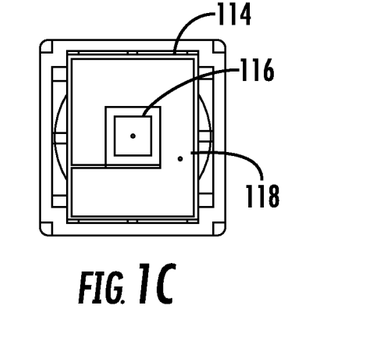
Figure 2:
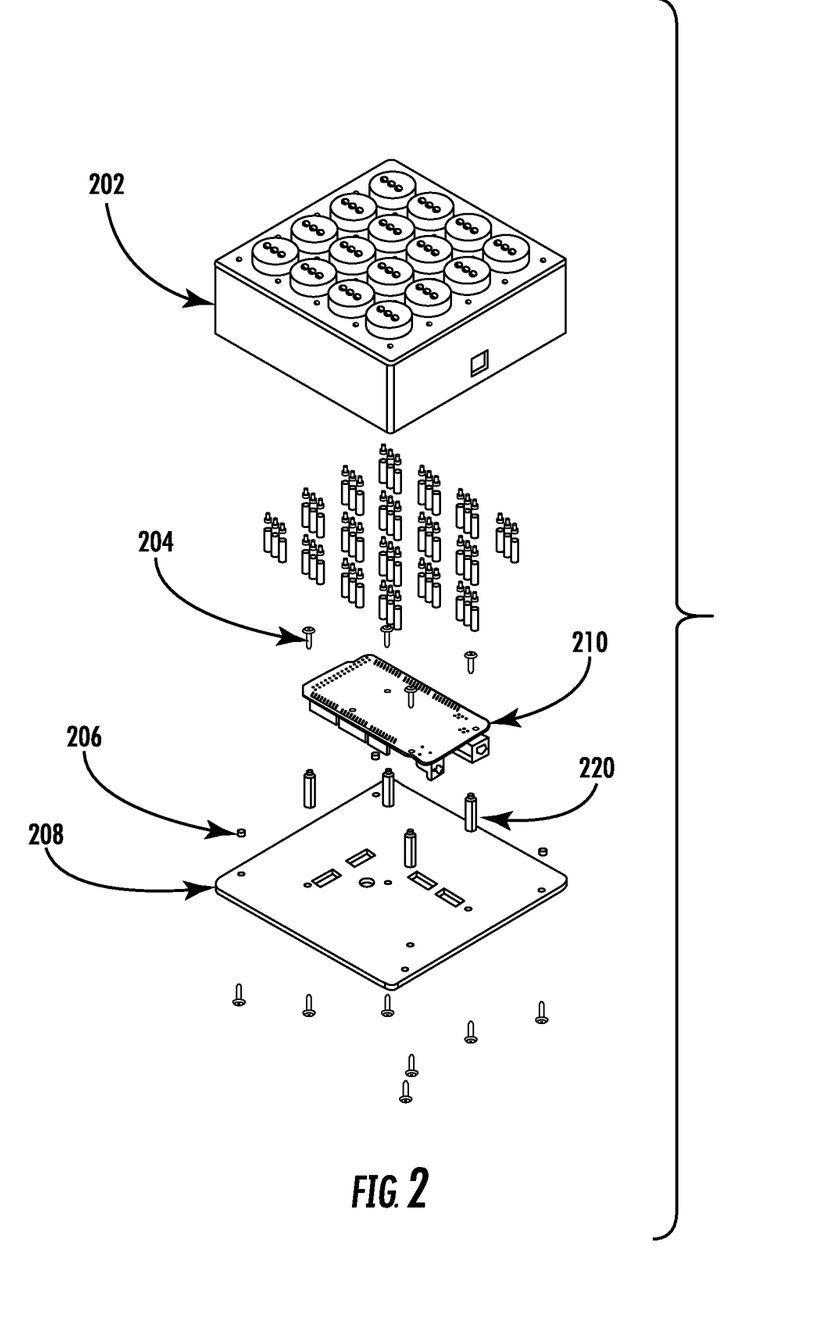
FIG. 2 illustrates an example base grid.

FIG. 1A illustrates an example system 100 for shadowing a physical configuration of stacking interlocking blocks in a virtual representation. System 100 includes a user device 102 comprising a display, one or more optional user input devices, and one or more processors for creating the virtual representation. System 100 also includes a grid base 104 and the stacking interlocking blocks 106. FIGS. 1B-C illustrate stacking interlocking blocks 106 in greater detail. FIG. 2 illustrates grid base 104 in greater detail.

Each block is an indivisible element of an interactive interface, and each block may be arranged and coupled with other blocks within the interface. A block need not be coupled physically to any other block in order to affect change in the digital or physical phases of the environment. When blocks are coupled they may receive feedback concerning their new state and arrangement with respect to other blocks in the set. As a direct result of the feedback to any single block, any other block in the set may change state as governed by either digital or physical mechanisms.

In the case of a digital mechanism, a service detects the state change and computes a result via internal logic, this result (which may be null) is transmitted to a set or subset of blocks. The digital mechanism may be local to the blocks or remote. In the case of a physical mechanism, a change in state (including but not limited to orientation, light, and sound) may be indicated in one or more blocks as the direct result of any change in state of the set of blocks.

In some examples the system includes a base grid, a set of blocks, a device manager, and a central processor. The signals sent by the base grid can be received by the device manager. The device manager could be a computer, mobile device or computer-enhanced television. The device manager may either directly compute results based on the state of the blocks or communicate the state to a remote service. One result of the computation is a shadow of the physical configuration of the blocks in a virtual environment such as a video game or interactive movie or television program.

A second result maybe a restriction or expansion of the set of states which may be reachable via the next input. This is possibly based upon a finite sequence of previous inputs rather than only the immediate previous result. Finally, we note that the shadowing occurs in real time such that the physical interactivity can correlate directly with activity taking place on the screen.

Block Subsystem

Figure 1D:
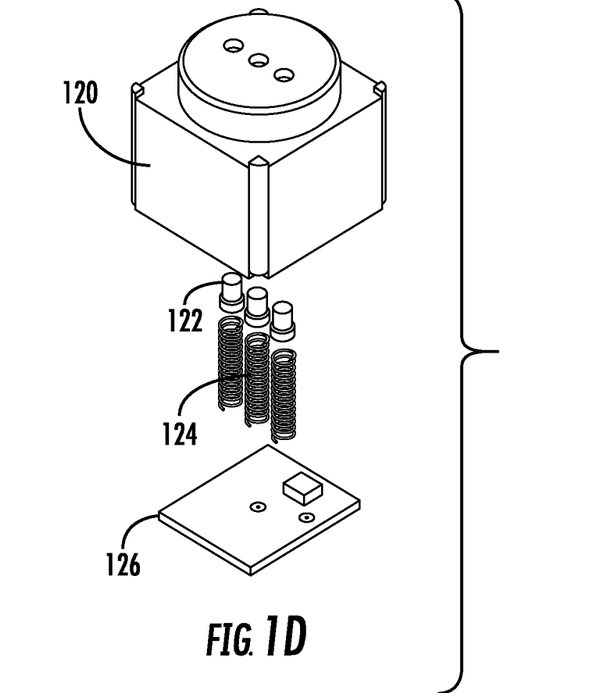

The physical blocks can contain circuit boards embedded within an outer shell. The portion of the block with which the child interacts has the look and feel of a conventional interlocking brick, and can be used to build standalone physical structures. The blocks geometry is generally a square prism shape with a shallow cylindrical shape at its top surface. The entire block can be, e.g., approximately 31 mm×31 mm×25 mm high. Atop each corner of the square prism portion is a small wedge-shaped raised surface that functions to lock stacked blocks together as well as keep blocks registered to avoid twisting in x-y space when stacked vertically. The blocks do not need to be the shape or size depicted and do not necessarily have to have the specific interlocking feature depicted. FIG. 1D shows an example of the raised surface over a housing 120.

Each individual block includes a housing 120, e.g., a plastic shell, with a square or rectangular block base and one or more cylindrical tops with a series of through holes on its top. The blocks can be any appropriate shape. Each through hole contains a protruding electrically conductive contact 122 as shown in FIG. 1D. A printed circuit board 126 is connected via springs 124 to the contacts and mounted slightly above the base of the square portion of the block geometry. When a block is placed atop one of the raised cylindrical surfaces or nodes on the grid base, the protruding contacts on the node make a connection with the bottom surface of the lower, circuit board in the block. This connection provides power to the blocks circuit board as well as enabling communication to other blocks and the grid base play surface. This communication enables the registration of an individual blocks presence and x-y-z location.

Subsequent blocks placed atop a block that is already connected to the grid, e.g., as illustrated in FIG. 1B, will receive power through the lower block (which is powered because of its grid connection) and similarly be able to broadcast presence and x-y-z location. The springs mounted between the top and bottom circuit boards provide a robust connection 112 between blocks or between a block and a grid base node as seen in FIG. 1B. The individually sprung pins 110 enable the blocks to withstand poor flatness tolerances and height discrepancies inherent to the mating surfaces due to manufacturing processes. Each PCB 114, e.g., as illustrated in FIG. 1C, contains at least two electrically isolated planes where one serves as ground 116 and one provides communication and power 118. In other configurations a third or fourth plane can be used in order to provide electrically isolated connections for power, communication, and addressing.

Figure 1E:
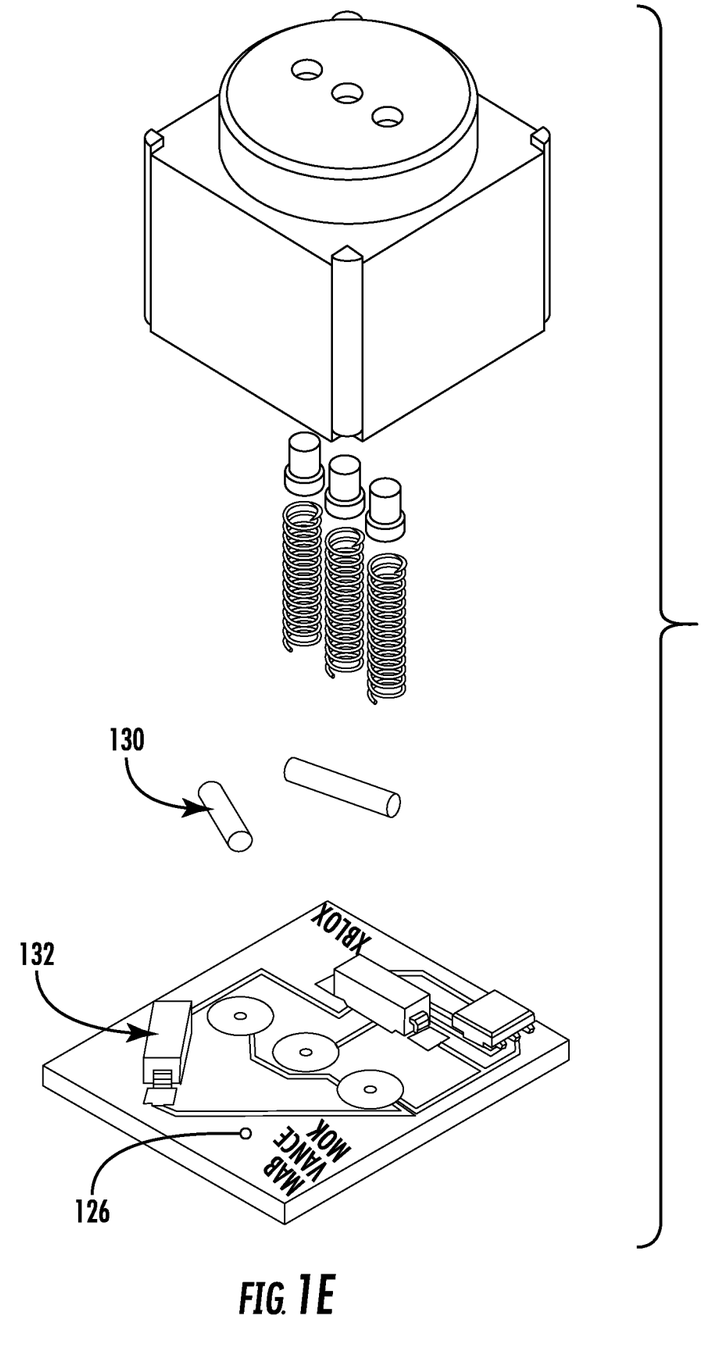
Figure 1F:
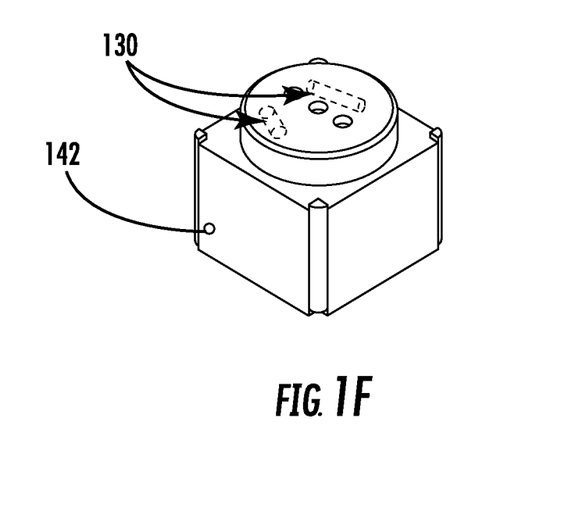
Figure 1G:
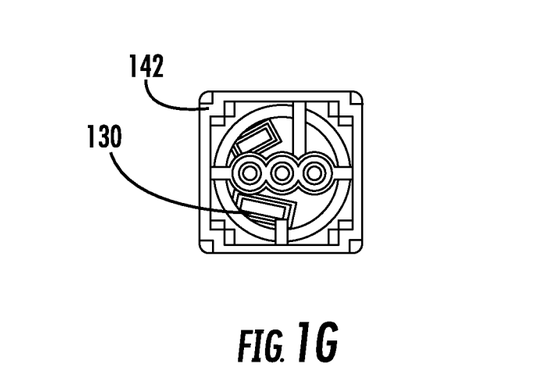

FIG. 1E shows an exploded view of an example block that illustrates reed switches 132 and magnets 130. Reed switches 132 and magnets 130 are used to communicate block positions. FIG. 1F is an isometric view of the example block that shows where magnets 130 are located inside of a plastic housing 142. In this configuration, when combined with other properties of the circuitry, 4 distinct orientations are guaranteed using only 2 inputs or switches. FIG. 1G is a bottom view of plastic housing 142 showing where magnets 130 are located. Although the example block includes a plastic housing, the housing can be formed of any appropriate material.

There are many possible block configurations and physical embodiments. For example, a subset of simple verifications on shape and nodal configuration is shown below:

Block configurations: 1×1, 2×1, 3×1, 2×2, irregular patterns representing more complex objects (i.e. vehicle, or human avatar)

Block shapes: Square prism, rectangular prism, cylinder, irregular shapes

Each block can be outfitted with a low-power microcontroller capable of reading and relaying sensor information to the base. The most prominent of these sensors are a pair of magnetic reed switches present in each block. Additionally, two magnets are placed internally toward the top of the block. These magnets are not strong enough to trigger the reed switches of the same block, but will trigger those of the block placed directly on top of it. Additionally, multi-node blocks (2×1, 3×1, 2×2, etc.) contain switching circuitry that the block's microcontroller can trigger to disable the power line to any blocks placed on top of one of its nodes.

Base Subsystem

The system also includes a base grid of rows and columns of nodes of raised cylindrical surfaces onto which individual blocks can be mounted. Each cylindrical surface has 2 to 5 through holes. Each base node has 2 to 5 copper contacts that protrude past the through holes, slightly proud of the upper surface of the node. The grid base also contains a microcontroller, battery and wired or wireless communication module to broadcast electronic signals to a virtual platform. When any of the individual blocks are placed onto a raised surface on the grid, their presence and row/column or x-y position on the grid is recognized and immediately broadcast to the virtual platform. When stacked atop one another, each blocks position in terms of height (z location) and orientation is also broadcast along with its row/column or x-y location. As illustrated in FIG. 2, the base grid includes a housing 202, screws 204, caps 206, a base board 208, standoffs 220, and a microcontroller 210.

LEDs have been embedded in the base to provide a variety of different feedback signals to the user. An example of an application involving the LED feedback is a mode in which the LEDs aid the user in determining the correct orientation of the base. Additional modes include but are not limited to indicating success or failure within the game, as well as visualizing battery life depletion.

Determining the correct orientation of the base is a key part of the unboxing and setup process, as the base block is preprogrammed to interact with the game software assuming the base to be oriented in a specific way. An incorrect orientation, as such, could potentially result in a frustrating and confusing gameplay experience. To facilitate successful orientation, the LEDs, two green and two red, can be used to provide visual cues to the user. The two green LEDs indicate the back side of the base, while the two red LEDs indicate the front. Any appropriate number and/or color of LEDs can be used. The colors will correspond to same-color indicators on the screen during game setup. The user will then rotate the base until the LEDs match what is indicated on the screen. In addition to aiding in proper setup, the LEDs are used to provide feedback to the user throughout the game. For example, if the user correctly places the blocks to complete the challenge, the green LEDs flash or illuminate to indicate successful completion of the task. Conversely, if the user fails to complete the challenge within the constraints set forth, the red LEDs illuminate, indicating a failure to complete the task. Such phenomena would also occur on the screen, in order to continue to perpetuate the unity between the physical and virtual experiences. The LEDs may also inform the user of issues related to the base block itself. As the batteries begin to get low and need to be charged, the LEDs flash in a specified pattern to indicate to the user that the base should be charged. Such illumination is also used to indicate when the batteries are too depleted to successfully connect the base to the game, thus alleviating frustration related to troubleshooting why the base is not syncing with the game in a low battery situation.

The layout and physical characteristics of the grid are highly variable. In other examples the base may have: Multi-Resolution, coloring, special nodes with unique sensing/actuation features, extrusions representing environment, etc. . . . . Furthermore, the grid may be tethered or wireless (wifi, Bluetooth, RF, visible light, IR, sound, etc.).

Software—Interblock Communication Protocol

Each node on the baseboard contains a dedicated communications line. The protocol used by the baseboard to communicate with the blocks uses only the power and ground wires connected to each block. The communications protocol is a timing-based protocol—each signal is transmitted by holding the power line low for a designated timing period. There are three elementary types of messages conveyed in this manner: RESET, 1-BIT, and 0-BIT. RESET is responsible for alerting the line that a message is about to be transmitted while 1-BIT and 0-BIT are used in conjunction to transmit arbitrary commands and responses between entities on the line. Since signal transmission briefly disables the power line, each block is powered during this period by a capacitive reserve power circuit. Additionally, as part of the protocol, each block microcontroller is preprogrammed with a unique ID. We note that the ID is GUID and it is not necessary to sequentially assign such identifiers or maintain an inventory of assigned IDs.

Interactions between a block and the board are typically conducted as follows. The baseboard transmits a RESET command on a node that tells the blocks on that node that an interaction is about to happen. Next, the baseboard sends a command, optionally prefixed with a target address, in the form of a sequence of 0-BIT and 1-BIT signals. Once the command is executed by the target(s), a result is transmitted to the baseboard in the same way. In the absence of a target address, the command is addressed to all blocks on the communications line.

Software—Structure Detection

In order to digitally represent the structure built on the baseboard, both the order in which blocks are stacked and the orientation of individual blocks can be determined.

Orientation for each block is determined by querying the state of its reed switches. The placement of reed switches and magnets are such that each block corresponds exclusively to one of the four possible orientations.

The order in which blocks are stacked can be determined by the following algorithm. The master logs all IDs that are currently present on each communications line. A multi-node block is selected. The master then issues commands to disable the power line to one or more sub-nodes of the selected block. The master then notes which IDs are no longer present on the communications line. Any ID that is no longer present depends on the currently selected block and is connected to each of the disabled sub-nodes in some critical way. After re-enabling the power line, the master then performs this operation for all remaining permutations of multi-node blocks and their sub-nodes. From this information, the baseboard can reconstruct which multi-node blocks are connected to sub-nodes of other multi-node blocks.

The order in which single node blocks appear may remain ambiguous. However, since all single node blocks are equivalent, their order typically does not matter. If order does matter, then the user can be restricted to only placing one block at a time. Alternately a similar power line interruption may be implemented which searches a stack of single node blocks.

Figure 7:
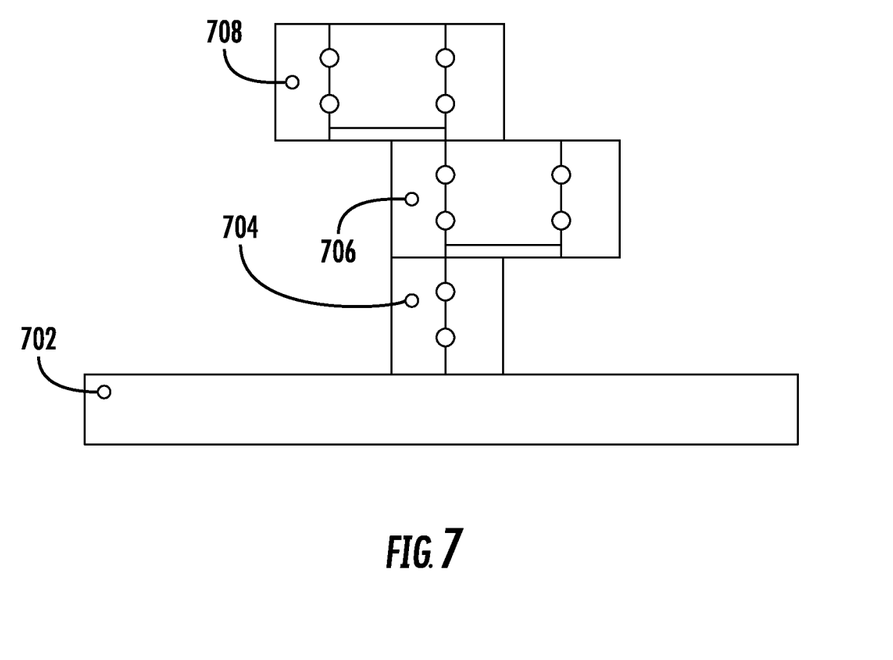
FIG. 7 illustrates a first example scenario of interblock communication.
Figure 8:
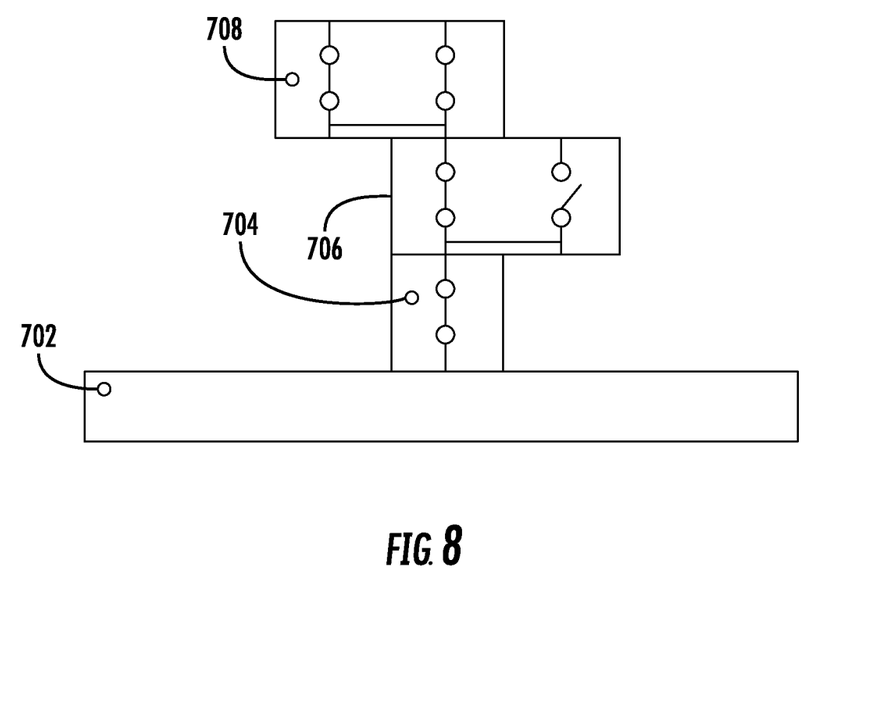
FIG. 8 illustrates a second example scenario of interblock communication.
Figure 9:
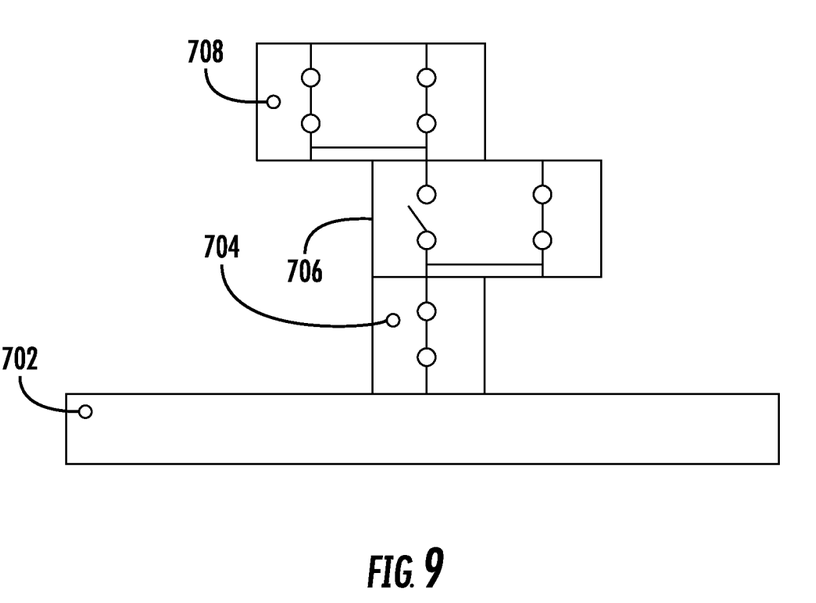
FIG. 9 illustrates a third example scenario of interblock communication.

FIGS. 7-9 illustrate an example scenario of interblock communication. In FIG. 7, a base 702 has three blocks 704, 706, and 708 stacked on top of each other. By default, all blocks contain closed switches that permit power and communication to pass to blocks on top. Since power and communication can pass from the base 702 to each of the three blocks 704, 706, and 708, the base 702 can send communications to each of the three blocks 704, 706, and 708.

In FIG. 8, the base 702 sends a signal to the first 2×1 block 706 instructing it to open one of its switches. Since opening this switch does not disrupt communication from any other block, the base 702 determines that no block is stacked on that node. In FIG. 9, the base 702 signals the other switch in the first 2×1 block 706 to open. In doing so, power and communications to the top block 708 is disrupted. The base 702 is then able to determine that the top block 708 is only connected through the left node of the first 2×1 block 706.

Software—Interpreting Block State

The content-coupled blocks enable a variety of unique media experiences which blur the line between gaming, free form play, and traditional passive consumption models (such as an episode of a TV show). We highlight four primary constraint types which can be used to define outcomes of interaction with the blocks which may occur as an integral part of the experience.

Figure 3:
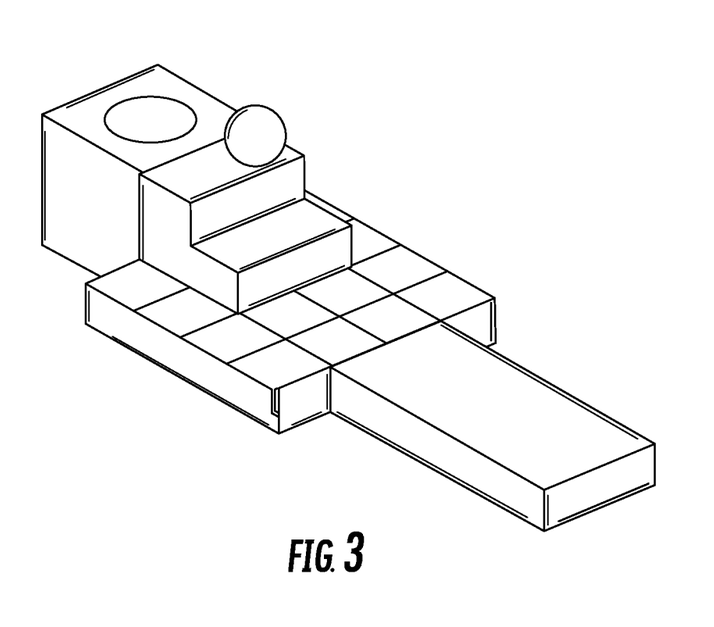
FIG. 3 depicts a generic scenario illustrating an example geometric constraint.

Geometric Constraint:

The user must build the proper form in order to progress. The form does not need to be exact, but it must satisfy a set of state-based constraints. State-based constraints may include the requirement of the presence of a set of blocks in a certain set of orientations and positions. A generic scenario describing the constraint is depicted in FIG. 3, where a user can build a set of steps to guide a ball to target hole.

Figure 4:
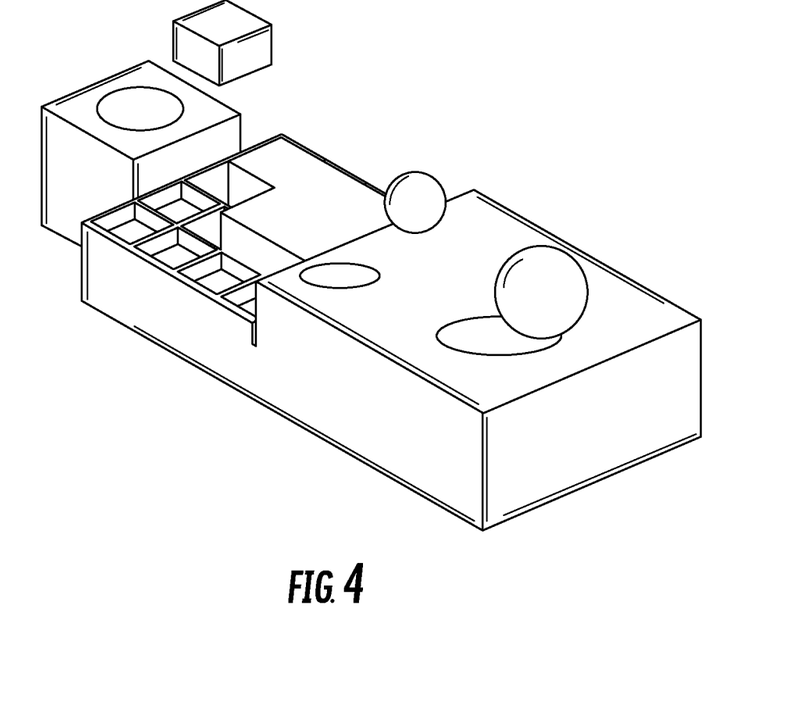
FIG. 4 depicts a generic scenario illustrating an example temporal constraint.

Temporal Constraint:

The user must satisfy another constraint (of any form) within a certain amount of time. Time maybe implicit or explicit (i.e., can be the logical progression of events rather than 10 ms). A generic scenario describing this constraint is depicted in FIG. 4, where a user builds a bridge so that one ball can traverse a gap to a target hole before another ball.

Figure 5:
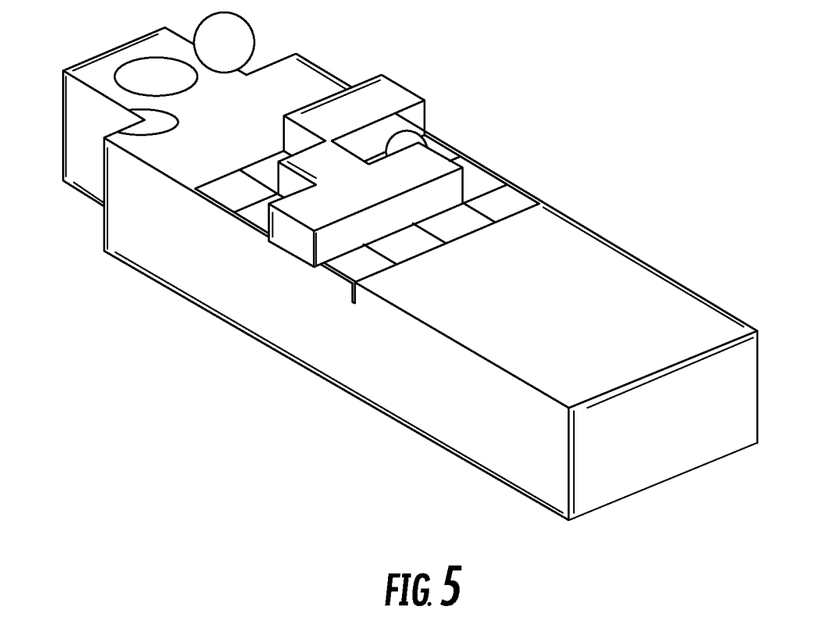
FIG. 5 depicts a generic scenario illustrating an example resource constraint.

Resource Constraint:

The user must satisfy another constraint using a certain number of resources. This could be a maximum, minimum, or based on a solution to a secondary constraint. A generic scenario describing this constraint is depicted in FIG. 5, where a user builds a structure to prevent one ball from reaching the target hole before another ball can reach the target hole. The user has a limited number of blocks, so the solution space is restricted.

Figure 6:
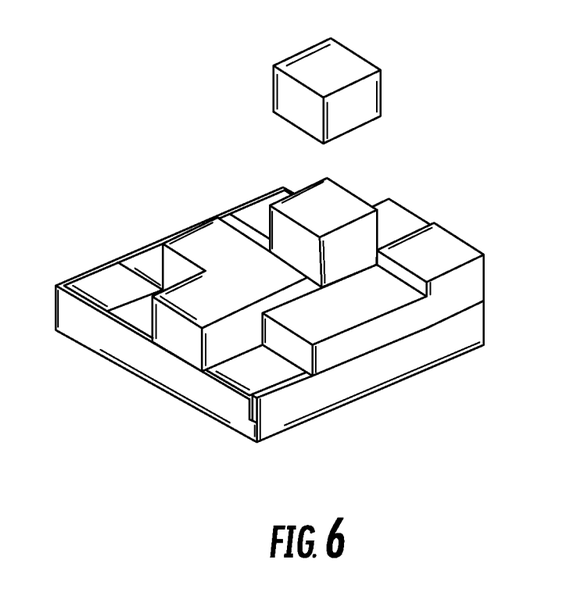
FIG. 6 depicts a generic scenario illustrating an example logical constraint.

Logical Constraint:

The user must satisfy a higher level constraint such that another agent in the experience has a certain set of reachable states. A generic scenario describing this constraint is depicted in FIG. 6, where a user builds a structure to seed a media experience via comparison to known geometric constraints.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
a plurality of stackable, interlockable blocks each comprising a block circuit;
a grid base for receiving the blocks in a physical configuration, the grid base comprising an embedded computing system configured, by virtue of communicating with each of the block circuits, to determine a position of each block with respect to the grid base; and
a user system in communication with the embedded computing system, the user system comprising a display device and one or more processors configured to shadow the physical configuration of the blocks in a virtual environment using the positions of the blocks and display a view of the virtual environment on the display device;
wherein the blocks comprise at least one multi-node block that comprises switching circuitry, wherein the multi-node block is configured to trigger the switching circuitry to disable a power line to any blocks placed on top of at least one node of the multi-node block;
wherein the embedded computing system is configured for determining an order in which at least two blocks are stacked by causing the multi-node block to trigger the switching circuitry to disable the power line.

2. The system of claim 1, wherein the embedded computing system of the grid base comprises a microcontroller and a battery, and wherein the microcontroller is configured to repeatedly communicate the positions of the blocks in real time or near real time using a wireless data signal.

3. The system of claim 1, wherein each block comprises a rectilinear polyhedron comprising:
a top wall and a bottom end; and
four side walls extending orthogonally away from the top wall to the bottom end, each of the four walls having an interior surface facing a geometric center of the block and an opposing exterior surface exposed outside of the block.

4. The system of claim 1, wherein each block is configured to confirm, using the block circuit of the block, the presence of the block on the grid base using at least two direct electrical contacts that electrically couple a top wall of the block to a bottom end of the block.

5. The system of claim 4, wherein the block circuit of each block comprises one circuit board with at least two electrically isolated planes that receive ground, power, and signal through the direct electrical contacts.

6. The system of claim 5, wherein the block circuit of each block is configured to receive power supplied by the grid base through the direct electrical contacts.

7. The system of claim 5, wherein the block circuit of each block comprises a communications module configured to communicate with the grid base using a communications protocol and the direct electrical contacts.

8. The system of claim 4, wherein each block is configured to confirm, using the block circuit of the block, the presence of the block atop another block by virtue of communicating with the grid base through the other block.

9. The system of claim 1, wherein each block comprises one or more reed switches, and wherein each block is configured to confirm, using the block circuit of the block, the orientation of the block relative to at least one other block using the one or more reed switches.

10. The system of claim 1, wherein the user system is in communication with the embedded computing system over a wireless link, and wherein the embedded computing system is configured to transmit data characterizing the positions of the blocks to the user system in real time or near real time to show, on the display of the user system, the absence or presence of blocks on the grid base.

11. A method performed by an embedded computing system of a grid base, the method comprising:
communicating with a plurality of stackable, interlockable blocks each comprising a block circuit, wherein the blocks are stacked on top of the grid base in a physical configuration;
determining, based on communicating with the plurality of blocks, a position of each block with respect to the grid base, wherein the blocks comprise at least one multi-node block that comprises switching circuitry, wherein the multi-node block is configured to trigger the switching circuitry to disable a power line to any blocks placed on top of at least one node of the multi-node block;
providing the positions of the blocks to a user system comprising a display device and one or more processors configured to shadow the physical configuration of the blocks in a virtual environment using the positions of the blocks and display a view of the virtual environment on the display device; and
determining an order in which at least two blocks are stacked by causing the multi-node block to trigger the switching circuitry to disable the power line.

12. The method of claim 11, wherein the embedded computing system of the grid base comprises a microcontroller and a battery, and wherein the method comprises repeatedly communicating the positions of the stacking interlocking blocks in real time or near real time using a wireless data signal.

13. The method of claim 11, wherein each stacking interlocking block comprises a rectilinear polyhedron comprising:
a top wall and a bottom end; and
four side walls extending orthogonally away from the top wall to the bottom end, each of the four walls having an interior surface facing a geometric center of the block and an opposing exterior surface exposed outside of the block.

14. The method of claim 11, wherein each block is configured to confirm, using the block circuit of the block, the presence of the block on the grid base using at least two direct electrical contacts that electrically couple a top wall of the block to a bottom end of the block.

15. The method of claim 14, wherein the block circuit of each block comprises one circuit board with at least two electrically isolated planes that receive ground, power, and signal through the direct electrical contacts.

16. The method of claim 15, comprising supplying power to the block circuit of each block through the direct electrical contacts.

17. The method of claim 15, comprising communicating with the block circuit of each block using a communications protocol and the direct electrical contacts.

18. The method of claim 14, wherein each block is configured to confirm, using the block circuit of the block, the presence of the block atop another block by virtue of communicating with the grid base through the other block.

19. The method of claim 11, wherein each block comprises one or more reed switches, and wherein each block is configured to confirm, using the block circuit of the block, the orientation of the block relative to at least one other block using the one or more reed switches.

20. The method of claim 11, wherein providing the positions of the blocks comprises transmitting the positions of the blocks over a wireless link, including transmitting data characterizing the positions of the blocks to the user system in real time or near real time to show, on the display of the user system, the absence or presence of blocks on the grid base.

* * * * *